US009883130B2

(12) United States Patent
Guidash

(10) Patent No.: US 9,883,130 B2
(45) Date of Patent: Jan. 30, 2018

(54) IMAGE SENSOR WITH FEEDTHROUGH-COMPENSATED CHARGE-BINNED READOUT

(71) Applicant: Rambus Inc., Sunnyvale, CA (US)

(72) Inventor: Michael Guidash, Rochester, NY (US)

(73) Assignee: Rambus Inc., Sunnyvale, CA (US)

(*) Notice: Subject to any disclaimer, the term of this patent is extended or adjusted under 35 U.S.C. 154(b) by 0 days.

(21) Appl. No.: 15/059,229

(22) Filed: Mar. 2, 2016

(65) Prior Publication Data

US 2016/0269666 A1   Sep. 15, 2016

Related U.S. Application Data

(60) Provisional application No. 62/130,483, filed on Mar. 9, 2015, provisional application No. 62/160,037, filed on May 12, 2015.

(51) Int. Cl.
| | |
|---|---|
| *H04N 5/378* | (2011.01) |
| *H04N 5/232* | (2006.01) |
| *H04N 5/347* | (2011.01) |
| *H04N 5/374* | (2011.01) |
| *H04N 5/376* | (2011.01) |
| *H04N 5/3745* | (2011.01) |

(52) U.S. Cl.
CPC ......... *H04N 5/378* (2013.01); *H04N 5/23245* (2013.01); *H04N 5/347* (2013.01); *H04N 5/3745* (2013.01); *H04N 5/3765* (2013.01)

(58) Field of Classification Search
CPC ...... H04N 5/378; H04N 5/3745; H04N 5/347; H04N 5/23245; H04N 5/3765
See application file for complete search history.

(56) References Cited

U.S. PATENT DOCUMENTS

| 4,689,808 A | 8/1987 | Moorman et al. | |
|---|---|---|---|
| 7,402,789 B2 | 7/2008 | Bock | |
| 7,773,138 B2 | 8/2010 | Lahav et al. | |
| 8,780,238 B2 | 7/2014 | Bowers | |
| 9,264,639 B2 * | 2/2016 | Guidash | ................. H04N 5/374 |
| 2008/0001067 A1 * | 1/2008 | Asaba | .................... H04N 5/343 |
| | | | 250/208.1 |
| 2008/0024618 A1 | 1/2008 | Lim et al. | |
| 2008/0260291 A1 | 10/2008 | Alakarhu et al. | |
| 2009/0207292 A1 * | 8/2009 | Watanabe | .............. H04N 5/365 |
| | | | 348/308 |
| 2010/0066849 A1 | 3/2010 | Lim et al. | |
| 2011/0013040 A1 | 1/2011 | Han et al. | |
| 2012/0194720 A1 | 8/2012 | Bowers | |
| 2012/0281121 A1 | 11/2012 | Kim | |
| 2013/0021441 A1 | 1/2013 | Kim | |

(Continued)

FOREIGN PATENT DOCUMENTS

JP       2002199282 A   *   7/2002

*Primary Examiner* — Timothy J Henn
(74) *Attorney, Agent, or Firm* — Charles Shemwell

(57) ABSTRACT

In an integrated-circuit image sensor having a pixel array, first and second control pulses that enable photocharge transfer from respective first and second photosensitive elements to a shared floating diffusion node are staggered in time such that capacitive feedthrough to the shared floating diffusion node from a trailing edge of the first control pulse is counteracted by capacitive feedthrough to the shared floating diffusion node from a leading edge of the second control pulse.

21 Claims, 4 Drawing Sheets

(56) References Cited

U.S. PATENT DOCUMENTS

| | | | |
|---|---|---|---|
| 2015/0229859 A1* | 8/2015 | Guidash | H04N 5/374 348/308 |
| 2016/0028974 A1* | 1/2016 | Guidash | H04N 5/37455 348/294 |
| 2016/0150174 A1* | 5/2016 | Hynecek | H04N 5/37457 348/308 |

* cited by examiner

IMAGE SENSOR WITH FEEDTHROUGH-COMPENSATED CHARGE-BINNED READOUT

CROSS-REFERENCE TO RELATED APPLICATIONS

This application hereby claims priority to and incorporates by reference each of the following U.S. Provisional Patent Applications:

| Application No. | Filing Date | Title |
|---|---|---|
| 62/130,483 | 09-Mar-2015 | Image Sensor with Feedthrough-Compensated Charge-Binned Readout |
| 62/160,037 | 12-May-2015 | Image Sensor with Feedthrough-Compensated Charge-Binned Readout |

TECHNICAL FIELD

The present disclosure relates to the field of integrated-circuit image sensors.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which.

DETAILED DESCRIPTION

Image sensors that compensate for undesired control-signal feedthrough during charge-binned pixel readout operations are disclosed in various embodiments. In a number of embodiments, for example, transfer-gate control pulses that enable photocharge to be transferred from respective photosensitive elements to a shared floating diffusion node (i.e., for charge aggregation therein) are time-staggered to effect leading and trailing control pulses in which the falling edge of the leading control pulse and the rising edge of the trailing control pulse have opposite polarities and occur closely enough in time to cancel (or negate or substantially attenuate) capacitive feedthrough to the floating diffusion node that would otherwise result from either of the rising or falling edges in isolation. This control-staggered capacitive feedthrough cancellation significantly reduces post-charge-transfer settling time at both the floating diffusion node and pixel output line. The reduced pixel output settling time, in turn, enables a significantly reduced time between floating diffusion reset-state capture and signal-state capture in a correlated double sample (CDS) readout, thereby increasing SNR (signal-to-noise ratio) and timing headroom. These and other embodiments, features and configurations are described in greater detail below.

Figure 1:
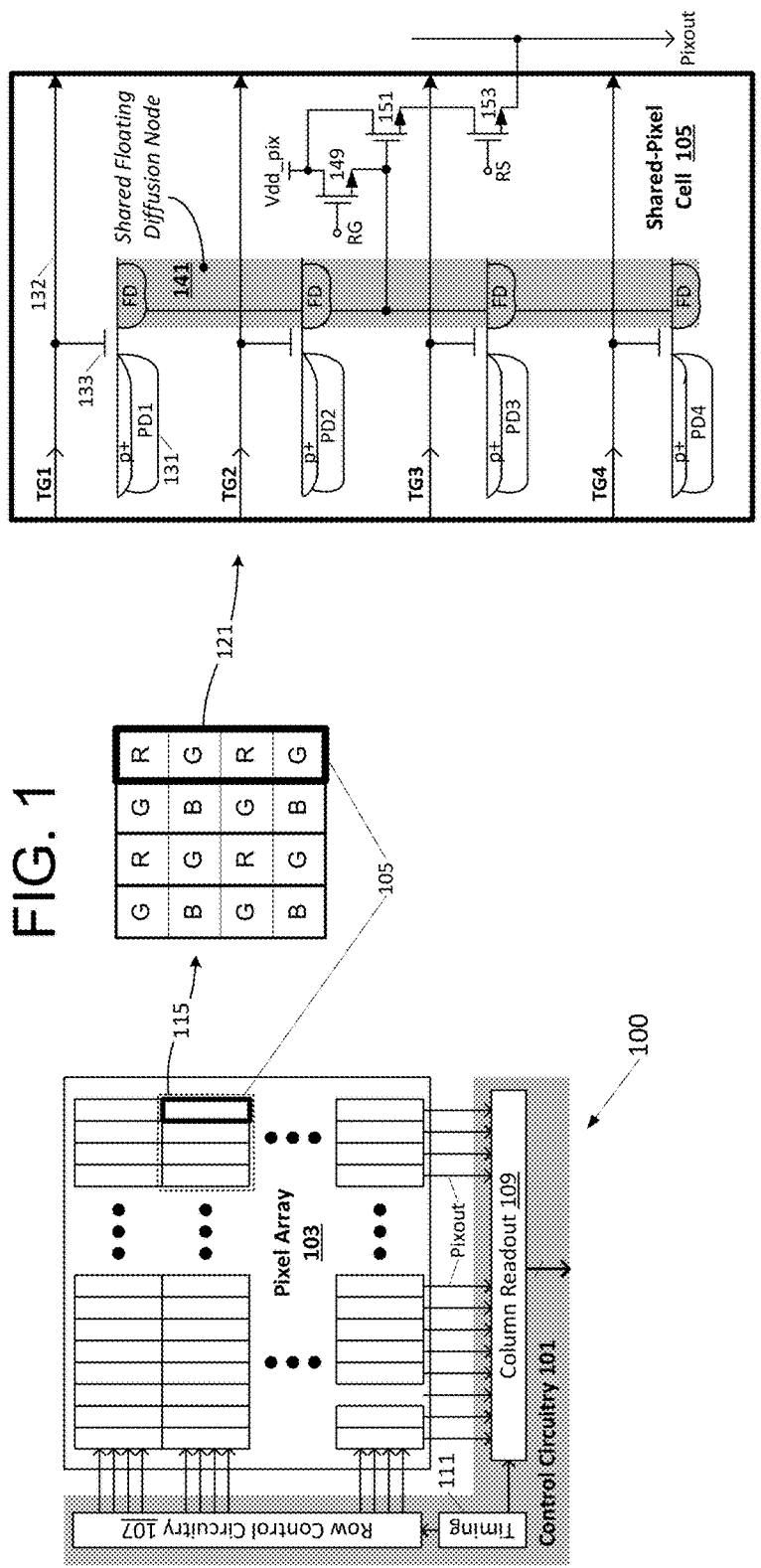
FIG. 1 illustrates an embodiment of a shared-pixel image sensor having a pixel array and control circuitry that generates time-staggered control signals to compensate for undesired control-signal feedthrough during charge-binned readout from the pixel array.

FIG. 1 illustrates an embodiment of a shared-pixel image sensor 100 having control circuitry 101 to enable staggered-control feedthrough compensation during charge-binned readout with respect to pixel array 103. In the particular embodiment shown, the pixel array 103 is populated by rows and columns of 1×4 (one column by four row) shared-pixel cells 105, also referred to herein as "unit cells." Each row of shared-pixel cells receives a respective set of row control signals from row control circuitry 107, and each column of shared-pixel cells is coupled to a respective pixel output line ("pixout," also referred to herein as a "column output line") so that a row-selected pixel cell may drive a pixel output signal ("pixout signal") to column readout logic 109.

As shown, row control circuitry 107 and column readout circuitry 109 are components of the aforementioned control circuitry 101, which also includes timing circuitry 111 (or sequencing circuitry or readout control circuitry) that issues timing and control signals to coordinate operations within row control circuitry 107 and column readout circuitry 109. More specifically, timing circuitry 111 enables row control circuitry 107 to implement a rolling sequence of exposure and readout operations with respect to the rows of shared-pixel cells (i.e., progressing row by row with respect to shared pixel cells and individual pixels therein), and to enable signal sampling and analog-to-digital (A/D) conversion operations ("digitization operations" or "ADC operations") within column readout circuitry 109 with respect to signals driven onto respective pixout lines. Though not specifically shown, control circuitry 101 may include additional circuitry for post-ADC processing of readout results (e.g., image reconstruction circuitry to combine some or all readout results from constituent subframes of a larger image frame interval in an oversampling mode or embodiment) and/or driving raw readout results and/or reconstructed image data onto an external signaling channel (e.g., physical signaling interface (PHY)) in accordance with proprietary or standardized signaling protocols, etc.

Still referring to FIG. 1, one or more arrays of color filter elements (not specifically shown) may be overlaid on pixel array 103 to enable development of color images (i.e., by resolving the light incident upon individual pixels into different wavelength bands), with the individual pixels of array 103 being referred to by the wavelength bands ("colors") passed by their respective filtering elements. In one embodiment, for example (others are possible), "green," "red," and "blue," pixels are arranged within the Bayer pattern shown at 115. The Bayer pattern at 115 is overlaid on a set of four shared-pixel cells 105, with each shared-pixel cell in this case including four constituent pixels. In this arrangement, each shared-pixel cell includes two spatially-staggered pixels from each of two color planes (i.e., two green pixels 'G' and either two red pixels 'R' or two blue pixels 'B')—a circumstance exploited in a high-sensitivity "charge-binning" readout mode discussed below.

An exemplary implementation of 1×4 shared-pixel cell 105 (representative of all shared-pixel cells in pixel array 103) is shown in detail view 121. In the depicted embodiment, shared-pixel cell 105 includes four pinned photodiodes 131, PD1-PD4 (other photosensitive elements may be used and/or provided in greater or lesser quantity per unit cell), coupled to a shared floating diffusion node 141 via respective transfer gates 133. Each transfer gate 133 is coupled to a respective transfer-gate control line 132, so that, when a corresponding transfer-gate control signal, TG1-TG4, is asserted on that line, the transfer gate is switched to a conducting state to enable photocharge to be transferred from the corresponding photodiode 131 to shared floating diffusion node 141. Floating diffusion node 141 is switchably coupled to a supply voltage node or supply rail ("Vdd_pix") via reset-gate transistor 149 (controlled by a reset-gate signal, RG), and is coupled to the gate terminal of a source-follower transistor 151, which constitutes a shared in-pixel amplification element. More specifically, source-follower transistor 151 and a read-select transistor 153 are coupled in series between the supply rail and a pixout line so that, when the shared-pixel cell is selected for readout (i.e., read-select signal, RS, asserted at gate of read-select transistor 153), a bias current flowing on the pixout line causes the pixout voltage to follow the floating diffusion potential (i.e., source follower arrangement, as the voltage at the source of transistor 151, and thus the pixout signal, rises and falls with the voltage at floating diffusion node 141.

Figure 2:
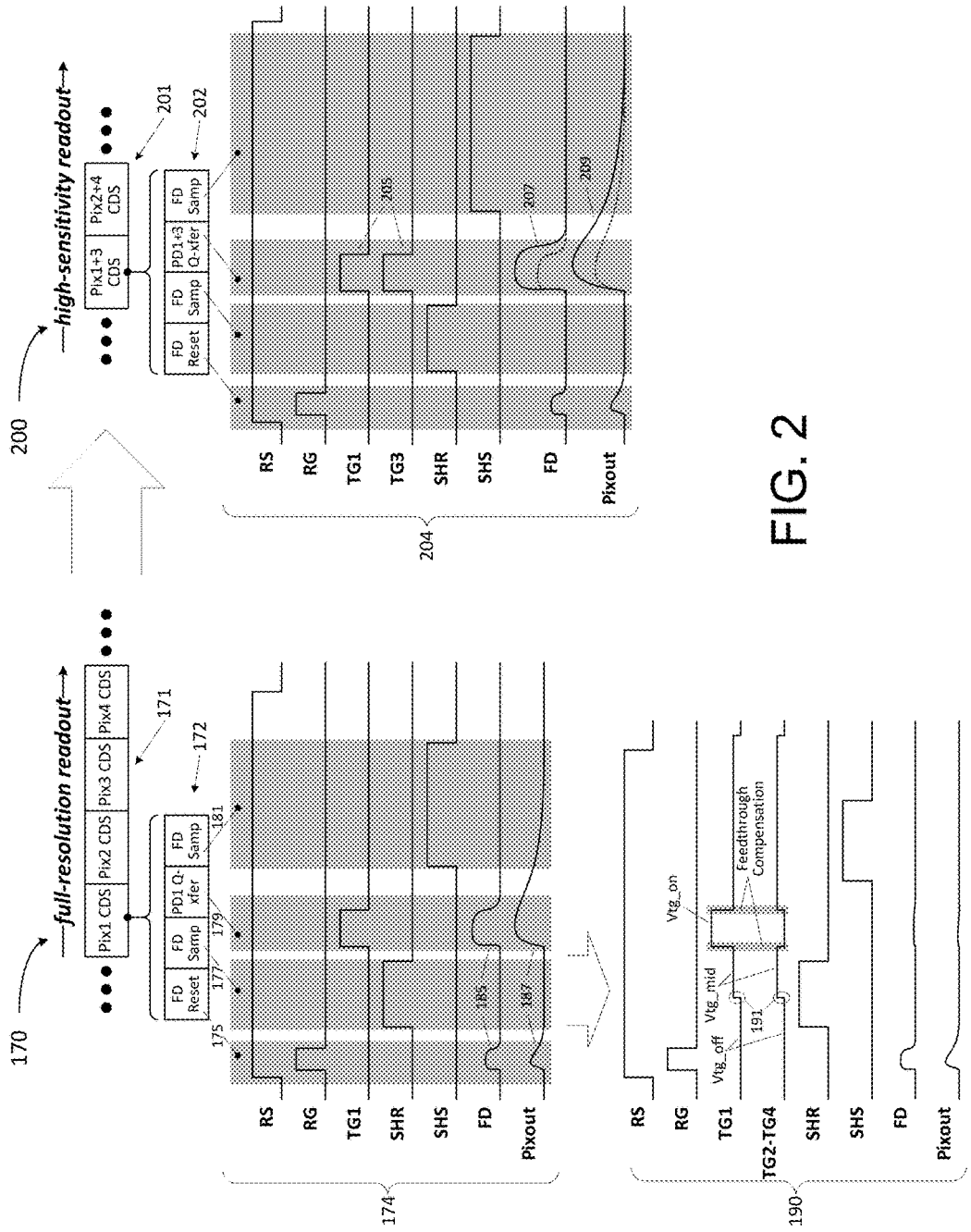
FIG. 2 contrasts exemplary full-resolution and high-sensitivity readout modes that may be implemented within the image sensor of FIG. 1.

FIG. 2 contrasts exemplary full-resolution and high-sensitivity readout modes that may be implemented within the image sensor of FIG. 1. In full-resolution mode, shown generally at 170, rows of individual pixels are readout sequentially, with a correlated double-sampling (CDS) operation being executed with respect to the pixels of each row before proceeding to the next. Thus, as shown at 171, CDS readouts are executed one after another with respect to the individual pixels of a given shared-pixel cell, before proceeding to the next shared-pixel cell (i.e., in a subsequent row of shared-pixel cells).

Constituent operations within the CDS readout of "Pix1" (i.e., the TG1-coupled pixel within the shared-pixel cell shown in FIG. 1) are shown at 172 and the waveform diagram at 174 and include:
  a floating diffusion reset operation 175 in which RG is asserted to charge the shared floating diffusion node (FD) to a "reset" potential in preparation for photocharge transfer;
  a reset-state sampling operation 177 in which an analog sample of the pixout voltage (representative of the FD reset-state potential by virtue of the RS signal assertion) is captured within a sample-and-hold element (i.e., within column readout circuitry 109 of FIG. 1) by pulsing reset-state sample-and-hold signal, SHR;
  a photocharge transfer operation 179 in which TG1 is pulsed to enable photocharge to be transferred from photodiode (i.e., PD1) to the shared floating diffusion node, thus effecting a floating diffusion node voltage having a voltage offset from the reset-state potential in accordance with the photocharge integrated within PD1 during a preceding exposure interval (i.e., measure of illuminance perceived by PD1); and
  a signal-state sampling operation 181 in which an analog sample of the pixout voltage (now representative of the photocharge potential+reset-state potential of the FD) is captured within another sample-and-hold element by pulsing signal-state sample-and-hold signal, SHS.

Though not specifically shown, the column readout circuitry finalizes the CDS readout result by digitizing (i.e., executing an A/D conversion with respect to) the difference between the signal-state and reset-state samples, thereby generating a digital value representative of the photocharge potential alone (i.e., reset-state potential being nominally canceled, as that potential is theoretically reflected in both the signal-state and reset-state samples).

Referring to the floating diffusion node (FD) and pixout voltages produced during the Pix1 CDS operation, it can be seen that the RG control pulse and TG1 control pulse yield capacitive feedthrough to the floating diffusion node (FD) and pixout line as shown at 185 and 187—a transient distortion that extends the pixout settling time and thus correspondingly extends the CDS time. The SNR loss incurred by the extended CDS time is particularly pronounced with respect to small, low-light signals, limiting the low-light sensitivity of the image sensor.

Still referring to FIG. 2, an exemplary full-resolution feedthrough compensation scheme is shown in waveform diagram 190. In general, the RS, RG, SHR and SHS signals are pulsed as described above (albeit with potentially different duration and earlier starting times enabled by more rapid pixout settling), while the TG (transfer-gate control) waveforms are modified to counteract capacitive feedthrough. More specifically, as shown at 191, all four transfer-gate control signals are raised (from Vtg_off) to Vtg_mid in preparation for an ensuing photocharge transfer operation, with the "active" TG signal (i.e., TG1 in this Pix1 readout example) then transitioning from Vtg_mid to Vtg_on simultaneously with a transition of the "nulling" TG signals (TG2, TG3 and TG4 in the Pix1 readout) from Vtg_mid to Vtg_off, where Vtg_on, Vtg_off and Vtg_mid have the following characteristics and nominal relationships:
  Vtg_off: inactive potential which, when applied to transfer gate, establishes an electrostatic barrier between photodiode and floating diffusion and thus prevents charge transfer;
  Vtg_on: active potential which, when applied to transfer gate, enables charge transfer from photodiode to floating diffusion node; and
  Vtg_mid: midpoint potential set to Vtg_off+[(Vtg_on−Vtg_off)/N] (where N is the number of constituent pixels (or photodiodes) within a shared-pixel cell), which is sufficiently low to maintain the electrostatic barrier between photodiode and floating diffusion node and thus prevent charge transfer.

By this arrangement, the falling-edge transitions of TG2, TG3 and TG4 from Vtg_mid to Vtg_off coincide with the rising-edge transition of TG1 from Vtg_mid to Vtg_on to yield a nominally zero sum of rising-edge and falling-edge transitions. Similarly, the falling edge of the TG1 signal, which transitions from Vtg_on to Vtg_mid, is counteracted by Vtg_off-to-Vtg_mid rising edges of TG2-TG4, so that the sum of rising-edge and falling-edge transitions is nominally zero. Accordingly, by routing the four TG lines to achieve balanced (i.e., uniform or substantially uniform) capacitive coupling with respect to the shared floating diffusion node, and implementing the transition amplitudes and polarities to yield such zero-sum rising-edge and falling-edge transitions (timing the transitions to occur simultaneously or with sufficient temporal proximity to counteract one another), photocharge transfer from PD 1 to the shared floating diffusion node may be enabled with negligible (or at least substantially attenuated) TG pulse feedthrough, significantly reducing the pixout settling time and thus shortening CDS time and raising SNR. In the particular embodiment shown, after the RS signal is lowered (thus decoupling the shared source-follower transistor from the pixout line), TG1-TG4 are lowered from Vtg_mid to Vtg_off in preparation for a subsequent readout cycle.

Various changes may be made to the feedthrough compensation shown at 190. For example, while a particular voltage relationship between TG voltage levels, Vtg_off, Vtg_mid and Vtg_on have been described, various other compensating arrangements and voltage relationships may be implemented in alternative embodiments. Also, while TG1-TG4 are shown as being initially raised to Vtg_mid while SHR is high (i.e., at 181 during reset-state capture), those signals may alternatively be raised to Vtg_mid at an earlier point in time (e.g., prior to RS signal assertion) to avoid disruption during reset-state capture.

Still referring to FIG. 2, in the high-sensitivity mode, shown generally at 200, a "charge-binned" CDS operation is executed in which charge from same-color plane pixels is merged (or combined or aggregated) within the shared-floating diffusion, thus raising the pixout signal level (i.e., relative to the signal level that would be generated by either of those pixels alone)—increasing sensitivity at the cost of spatial resolution. As shown in the high-level readout sequence at 201, the net number of CDS operations is halved (i.e., each CDS result reflects the combined photocharge within two same-color pixels, and thus pixels 1 and 3, or pixels 2 and 4). Moreover, the individual CDS operation (shown generally at 202 and in greater detail in timing diagram 204) is substantially the same as in full-resolution mode except that TG pulses are generated for each of two same-color plane pixels as shown at 205 (i.e., TG1 and TG3, or TG2 and TG4 in the Bayer arrangement shown in FIG. 1) so that photocharge is transferred from the photodiodes of each of those pixels to the shared floating diffusion node. As shown at 207 and 209, one consequence of this arrangement is substantially increased capacitive feedthrough (corresponding to the sum of the concurrent TG1 and TG3 rising edges and to the sum of the concurrent TG1 and TG3 falling edges), so that, absent feedthrough compensation, a substantially longer pixout settling time is required than in the non-compensated full-resolution CDS readout, meaning even longer CDS time and corresponding SNR loss. Moreover, because enhanced sensitivity mode is generally desirable in precisely the low-light conditions most impacted by SNR loss, the increased pixout settling time erodes a fundamental motivation (i.e., enhanced sensitivity) for incurring the additional circuitry and operational complexity of the charge-binning operation. Complicating matters further, the increased feedthrough from the two transfer-gate control pulses cannot be easily nulled with existing signals for a number of reasons. For one, fewer inactive TG signals (now only two in the example shown) remain available to null the dual-TG feedthrough, and for another, the sheer amplitude of the requisite feedthrough compensation pulse demands a correspondingly large nulling voltage transition, nontrivial to produce.

Figure 3:
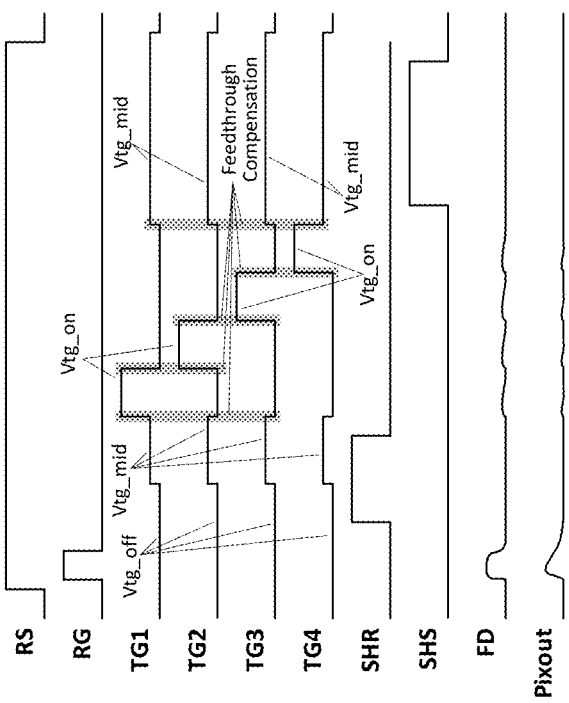
FIG. 3 illustrates an exemplary set of waveforms generated within the image sensor of FIG. 1 to implement feedthrough-compensated photocharge binning without requiring voltage transitions larger than those shown in the feedthrough-compensated full-resolution CDS readout of FIG. 2.

FIG. 3 illustrates an exemplary set of waveforms generated within the image sensor of FIG. 1 to implement feedthrough-compensated photocharge binning without requiring voltage transitions larger than those shown in the feedthrough-compensated full-resolution CDS readout of FIG. 2. In general, instead of pulsing the two active TG lines simultaneously, transfer-enabling TG pulses are staggered in time (i.e., implemented one after the other as shown at 215 and 217) such that the falling edge of the leading TG pulse 215 coincides with the rising edge of the trailing TG pulse 217 so that the two opposite-polarity transitions cancel the feedthrough that would be produced by either transition alone. As each TG line is raised to the transfer-enabling level (i.e., Vtg_on) at a different time, the full complement of remaining TG lines remains available to compensate the rising edge of the leading TG pulse and to compensate the falling edge of the trailing TG pulse. Moreover, the additional time required to stagger the two TG pulses (i.e., instead of asserting them concurrently) is inconsequential in view of the reduced readout resolution in the high-sensitivity readout. That is, the total number of row operations is reduced by two, for example, in the high-sensitivity readout shown in FIG. 2, so the readout timing budget can readily accommodate the minute additional time required for TG pulse staggering.

In the exemplary staggered-TG readout shown in FIG. 3, charge from photodiodes PD1 and PD3 are to be combined within the shared floating diffusion node, so that time-staggered transfer-enabling pulses 215 and 217 are generated on the TG1 and TG3 signal lines, with the TG1 pulse being the leading pulse and the TG3 pulse being the trailing pulse. As shown, prior to the transfer-enabling pulse sequence, all four TG lines are raised to Vtg_mid (a voltage level having a nominal relation to Vtg_on and Vtg_off as described above) so that, when TG1 transitions from Vtg_mid to Vtg_on, opposite-polarity transitions, from Vtg_mid to Vtg_off, on the other three TG lines provide feedthrough compensation. Thereafter, at 218, TG1 and TG3 transition at the same time, but with opposite polarity, from Vtg_on to Vtg_off and vise-versa, so that their transitions cancel capacitive feedthrough that would occur in response to either transition alone. Finally, at the conclusion of the staggered transfer-enabling pulse sequence, TG3 falls from Vtg_on to Vtg_mid, while the other three TG lines (TG1, TG2 and TG4) transition from Vtg_off to Vtg_mid in compensation. Thus, three separately compensated TG transitions to/from the Vtg_on potential are effected: (i) an opening compensation in which N−1 inactive TG lines null the rising edge of an initial transfer-enabling pulse on the remaining TG line, (ii) a mid-sequence compensation in which the falling edge of the initial transfer-enabling pulse and rising edge of a final transfer-enabling pulse (the latter on a formerly inactive TG line) null one another, and (iii) a closing compensation in which N−1 inactive TG lines (a different set from those in the opening compensation, though not a mutually exclusive set) null the falling edge of the final transfer-enabling pulse. Through this operation, capacitive feedthrough from the transfer-enabling TG pulses may be substantially canceled, permitting shortened CDS time (i.e., more quickly capturing the signal-state sample following TG pulse assertion by virtue of reduced pixout settling time) and correspondingly increased SNR, particularly in low-light conditions where most needed.

Still referring to FIG. 3, after the RS signal is lowered (thus decoupling the shared source-follower transistor from the pixout line), TG1-TG4 are lowered from Vtg_mid to Vtg_off in preparation for a subsequent readout cycle. Also, while TG1-TG4 are shown as being initially raised to Vtg_mid while SHR is high (i.e., during reset-state capture), those signals may alternatively be raised to Vtg_mid at an earlier point in time (e.g., prior to RS signal assertion) to avoid disruption during reset-state capture. Further, while the staggered transfer-enable pulse sequence has been shown with respect to signal lines TG1 and TG3, symmetric operation may be effected with respect to signal lines TG2 and TG4. Moreover, while capacitive feedthrough from the RG pulse is shown as being uncompensated in FIG. 3 and other drawing figures herein, in all cases, TG lines, other control lines and/or dedicated nulling signal lines may convey signals that null capacitive feedthrough from the RG line.

Figure 4:
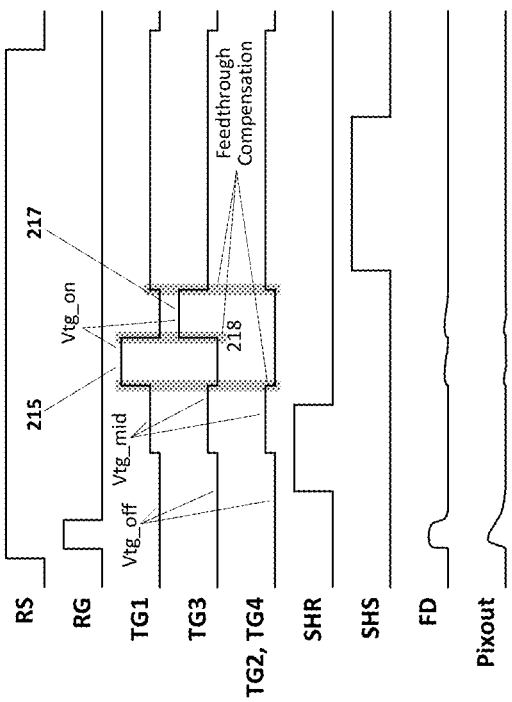
FIG. 4 illustrates an alternative feedthrough-compensated high-sensitivity readout operation within the image sensor of FIG. 1 in which charge from all photodiodes is combined within a shared floating diffusion node and thus without regard to pixel color.

FIG. 4 illustrates an alternative feedthrough-compensated high-sensitivity readout operation within the image sensor of FIG. 1 in which charge from all photodiodes is combined within a shared floating diffusion node and thus without regard to pixel color (e.g., as may be useful in extremely low light conditions where color may be imperceptible). As shown, charge-transferring pulses are staggered generally as discussed in reference to FIG. 3, except in a sequence of four transfer-enabling pulses instead of two. Thus, the falling edge of each TG pulse but the last is compensated by the rising edge of the immediately succeeding TG pulse, with the rising edge of the initial TG pulse and trailing edge of the final TG pulse being compensated by Vtg_mid-to-Vtg_off transitions of the three otherwise inactive TG lines (i.e., as in the embodiment of FIG. 3). Generalizing the approach shown in FIG. 4, a total of N+1 feedthrough compensation events are implemented (N being the number of photodiodes that share a floating diffusion node), with the initial and final compensation events being implemented by Vtg_mid-to-Vtg_off transitions of otherwise inactive TG lines, and each of the N−1 intervening compensation events implemented by opposite-polarity/equal-magnitude signal transitions (to and from Vtg_on) on different TG lines.

As with the two-pulse-stagger shown in FIG. 3, the additional time required for sequential application of transfer-enabling pulses on signal lines TG1-TG4 is readily available in view of the reduced row operation count (i.e., reduced by four in the example where four photodiodes are coupled to the same floating diffusion node—higher or lower photodiode/shared-floating diffusion ratios may be implemented in alternative embodiments). Also, while TG1-TG4 are shown as being initially raised to Vtg_mid while SHR is high (i.e., during reset-state capture), those signals may alternatively be raised to Vtg_mid at an earlier point in time (e.g., prior to RS signal assertion) to avoid disruption during reset-state capture.

Figure 5:
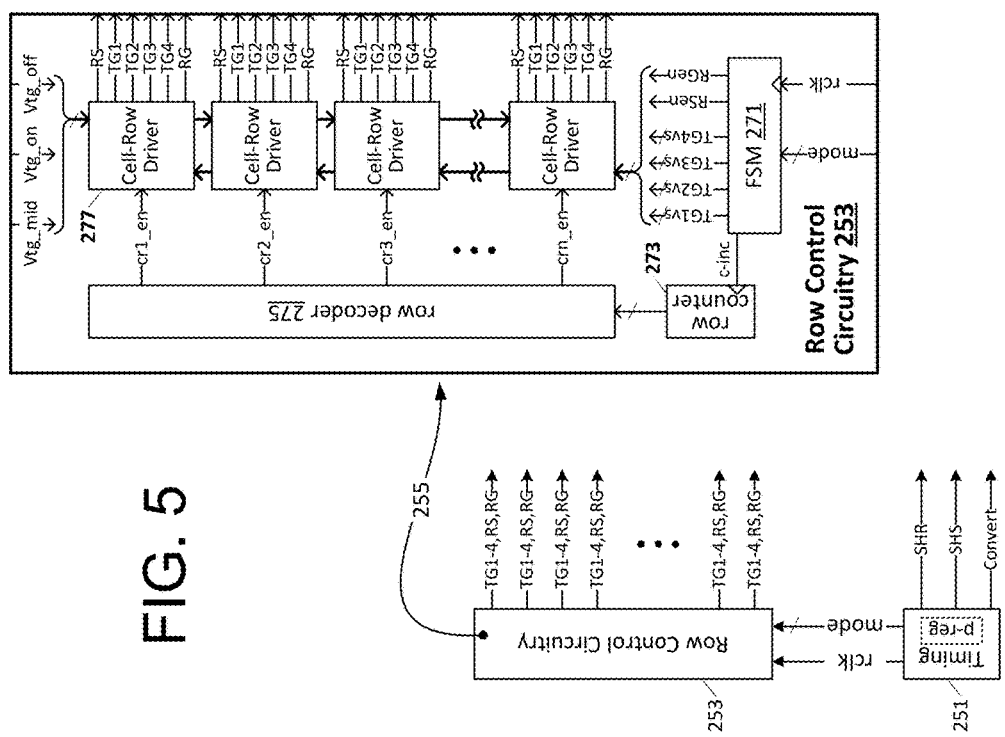
FIG. 5 illustrates an exemplary set of signals output from timing circuitry and row control circuitry that may be used to implement like-named components within the image sensor of FIG. 1.

FIG. 5 illustrates an exemplary (and non-exhaustive) set of signals output from timing circuitry 251 and row control circuitry 253 that may be used to implement like-named components within control circuitry 101 of FIG. 1, together with a more detailed embodiment of the row control circuitry 253. In the particular embodiment shown, timing circuitry 251 includes a programmable register ("p-reg") that may be programmed dynamically or statically with configuration information, including a readout mode value "mode" that indicates a current one of multiple possible operating modes, including the full-resolution readout mode discussed in reference to FIG. 2, the feedthrough-compensated high-sensitivity readout mode described in reference to FIG. 3, and/or the ultra-high-sensitivity readout mode described in reference to FIG. 4. In the case of dynamic programming, an auto-exposure controller implemented in the integrated-circuit die containing the image sensor (i.e., on the same chip therewith), or within another integrated circuit attached thereto (e.g., flip-chip interconnected logic die, or signaling-interface-connected image-signal processor, system-on-chip, etc.) or other control circuit may change the readout mode setting with in the programmable register on the fly according to perceived imaging conditions (e.g., bright light versus low light, which may be determined based at least partly on imaging data obtained from the pixel array), operator-specified settings, and/or any other information tending toward selection of one readout mode over another.

In the depicted embodiment, timing circuitry 251 outputs control signals to the column readout circuitry (not specifically shown) including, for example and without limitation, the reset-state and signal-state sample-and-hold signals (SHR and SHS), as well as a convert-enable signal ("convert"). The SHR and SHS signals may be omitted (and possibly replaced by other signals) in embodiments that directly capture digital samples of the reset-state and signal state (i.e., direct conversion in which the pixout line is supplied directly to an A/D converter without intervening analog signal storage elements). Various additional timing signals, voltage references, and/or control signals may also be issued to the column readout circuitry, for example, to select between conditional and unconditional pixel readout (the former being conditioned on determining that a threshold level of photocharge has been integrated within a subject pixel), manage image reconstruction operations, enable selective A/D conversion operations (e.g., executing successive-approximation-register and/or single-slope A/D conversion only on non-eclipsed, non-saturated pixels and/or pixels having threshold level of charge integration), control readout bandwidth (e.g., pixout biasing), enable pixout signal oversampling, effect selective signal compression (e.g., using a virtually-lossless lookup table or other ramp-step and/or step-time nonlinearity), etc.

Still referring to FIG. 5, timing circuitry 251 also outputs a row clock signal (rclk) and read-out mode value ("mode") to row control circuitry 253 (timing circuitry may output additional timing and/or control signals to row control circuitry in alternative embodiments), with the row clock having sufficiently fine granularity to effect control signal transitions at desired intervals, and mode value having any one of multiple states to indicate, for example, any of the three feedthrough-compensated readout modes described in reference to FIGS. 2-4.

Row control circuitry 253 responds to the row clock and readout mode by generating control signals (e.g., TG1, TG2, TG3, TG4, RS, RG) for each of the rows of pixel cells, resetting, exposing and reading out individual pixel rows, collections of two or more same-color pixel rows (i.e., within the same row of pixel cells), or collections of two or more multi-color pixel rows (e.g., all rows of pixels within the same row of pixel cells), accordingly.

The row control circuitry embodiment shown in detail view 255, includes a finite state machine 271, row counter 273, row decoder 275 and bank of cell-row signal drivers 277 (one for each row of pixel cells). Finite state machine 271, which may be a sequencer or any other control circuit implementation, responds to the incoming row clock and mode value by transitioning between a repeating sequence of control states corresponding to the row control signal transitions within a mode-value-selected one of the feedthrough-compensated readout operations discussed above. More specifically, upon transitioning between the control states corresponding to a given row readout operation, finite state machine 271 drives transfer-gate voltage-selection signals, TG1vs-TG4vs, between respective values (e.g., selecting Vtg_off, Vtg_mid or Vtg_on, which are supplied to each of the row signal drivers 277 ) to enable TG waveform generation on a row-decoder-selected set of TG lines, and similarly transitions reset-enable and read-select-enable signals, RGen and RSen to enable RG and RS signal waveforms on a row-decoder-selected set of RG and RS lines, with all signal transitions having amplitudes, polarities and timing as generally described above in reference to feedthrough-compensated readout operations. At the conclusion of each control-state iteration (e.g., implementing the control signals to readout the rows of pixels within a given pixel-cell row individually in full resolution mode, or in combinations of two or four in the enhanced sensitivity modes shown in FIGS. 3 and 4), finite state machine 271 asserts an increment signal ("inc") to advance row counter 273 and, as discussed below, thereby select a pixel-cell row for readout.

Still referring to FIG. 5, row counter 273 incrementally advances a row count value from zero to n−1 in response to increment signal assertion, where 'n' is the number of pixel-cell rows. Row decoder 275 decodes the row count value received from row counter 273 and asserts a corresponding cell-row-enable signal (cr1_en, cr2_en, . . . ) to the row-count indicated one of cell-row signal drivers 277, thus enabling each cell-row signal driver in sequence to implement a cell-row by cell-row readout of the pixel array. When enabled by row decoder 275, a given cell-row signal driver 277 generates the row control signals (e.g., including, without limitation, TG1-TG4, RG and RS) for a respective pixel-cell row, driving those signals in accordance with the enable signals and voltage-select signals from finite state machine 271. In one embodiment, for example, each cell-row signal driver 277 includes logic gates to AND the enable signals RSen and RGen from finite state machine 271 with the incoming cell-row enable signal from row decoder 275 to drive the RS and RG lines for the corresponding pixel-cell row, and selector circuits which, when enabled by the incoming cell-row enable signal, apply different TG line voltages (e.g., Vtg_mid, Vtg_on, Vtg_off, supplied to the cell-row drivers 277 as shown) to lines TG1-TG4 in accordance with the voltage-select signals (i.e., TG1*vs*, TG2*vs*, TG3*vs*, TG4*vs*) from finite state machine 271.

Figure 6:
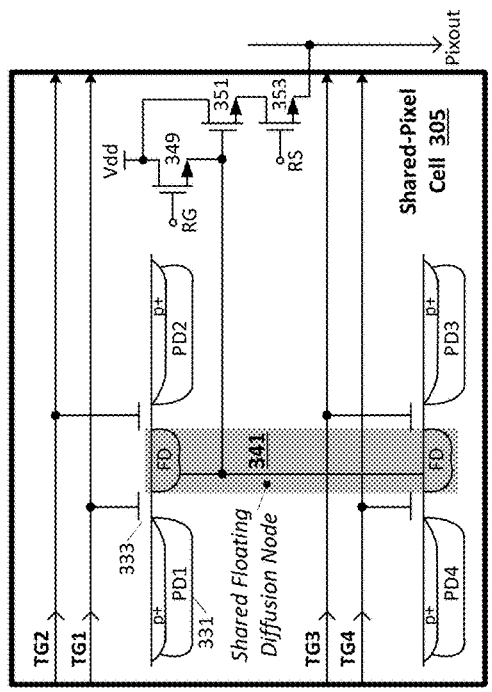
FIG. 6 illustrates an alternative embodiment of a shared-pixel cell organized in a 2-column by 2-row arrangement instead of the 1×4 arrangement shown in FIG. 1.

FIG. 6 illustrates an alternative color pattern 301 and corresponding embodiment of a shared-pixel cell 305 organized in a 2-column by 2-row arrangement (2×2 pixel cell) instead of the 1×4 arrangement shown in FIG. 1. In the depicted example, the TG1 and TG3 control lines control transfer gates 333 for diagonally disposed photodiodes 331 (i.e., PD1 and PD3) so that TG1 and TG3 pulses may be time-staggered as shown in FIG. 3 to enable feedthrough-compensated same-color-plane readout with respect to diagonally disposed pixels (e.g., green pixels in the specific instance shown) within exemplary color pattern 301. The TG2 and TG4 control lines control transfer gates for the remaining two diagonally disposed photodiodes PD2 and PD4, respectively, so that time-staggered control pulses on those control lines similarly enable feedthrough-compensated same-color-plane readout with respect to diagonally disposed pixels (i.e., panchromatic pixels, 'P' in the example shown—also referred to as white or clear). In extreme low-light conditions or other color-agnostic applications or circumstances, time-staggered control pulses may be generated on all four TG lines as shown in FIG. 4 to effect feedthrough-compensated readout of all four photodiodes within the 2×2 pixel cell. Thus, each of the feedthrough-compensated readout sequences described above in reference to FIGS. 2-4 may be employed in connection with the 2×2 pixel cell of FIG. 6 (including instances where different color filter array patterns are employed) to effect feedthrough-compensated pixout signal generation.

The various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within an integrated-circuit image sensor having a pixel array, the method comprising:
generating a first control pulse on a first signal line connected to a first pixel within the pixel array to enable photocharge accumulated within a photosensitive element of the first pixel to be transferred to a shared floating diffusion node; and
generating a second control pulse on a second signal line connected to a second pixel within the pixel array to enable photocharge accumulated within a photosensitive element of the second pixel to be transferred to the shared floating diffusion node and combined therein with the photocharge transferred from the photosensitive element of the first pixel, the first and second control pulses being staggered in time such that capacitive feedthrough to the shared floating diffusion node from a trailing edge of the first control pulse is counteracted by capacitive feedthrough to the shared floating diffusion node from a leading edge of the second control pulse.

2. The method of claim 1 wherein the first and second control pulses are staggered in time such that the trailing edge of the first control pulse is substantially aligned with the leading edge of the second control pulse.

3. The method of claim 1 further comprising generating a first compensation pulse on the second signal line staggered in time with respect to the first control pulse such that capacitive feedthrough to the shared floating diffusion node from a leading edge of the first control pulse is counteracted by capacitive feedthrough to the shared floating diffusion node from a trailing edge of the first compensation pulse.

4. The method of claim 3 further comprising generating one or more additional compensation pulses on one or more other signal lines, the one or more additional compensation pulses having respective trailing edges substantially aligned with the trailing edge of the first compensation pulse such that the one or more additional compensation pulses and the first compensation pulse act in combination to counteract capacitive feedthrough to the shared floating diffusion node from the leading edge of the first control pulse.

5. The method of claim 4 wherein each of the one or more additional compensation pulses and the first compensation pulse have an amplitude less than an amplitude of the first control pulse.

6. The method of claim 4 wherein the one or more additional compensation pulses and the first compensation pulse constitute a total of N compensation pulses and each have a nominal amplitude of A divided by N, where A is a nominal amplitude of the first control pulse and N is an integer greater than one.

7. The method of claim 4 wherein the one or more other signal lines comprise control signal lines connected to one or more other pixels, respectively, within the pixel array.

8. The method of claim 7 further comprising asserting a third control pulse on one of the one or more other signal lines to enable photocharge accumulated within a photosensitive element of the respective pixel connected to the one of the one or more other signal lines to be transferred to the shared floating diffusion node.

9. The method of claim 3 wherein an amplitude of the first compensation pulse is lower than an amplitude of the second control pulse and insufficient to enable photocharge transfer from the photosensitive element of the second pixel to the shared floating diffusion node.

10. The method of claim 3 further comprising generating a second compensation pulse on the first signal line staggered in time with respect to the second control pulse such that capacitive feedthrough to the shared floating diffusion node from a trailing edge of the second control pulse is counteracted by capacitive feedthrough to the shared floating diffusion node from a leading edge of the second compensation pulse.

11. An integrated-circuit image sensor comprising:
a pixel array including first and second pixels coupled to first and second signal lines, respectively, the first and second pixels having respective photosensitive elements and a shared floating diffusion node; and
control circuitry to generate first and second control pulses on the first and second signal lines, respectively, to enable photocharge accumulated within the photosensitive elements of the first and second pixels to be transferred to, and combined within, the shared floating diffusion node, the first control pulse being time-staggered relative to the second control pulse such that capacitive feedthrough to the shared floating diffusion node from a trailing edge of the first control pulse is counteracted by capacitive feedthrough to the shared floating diffusion node from a leading edge of the second control pulse.

12. The integrated-circuit image sensor of claim 11 wherein the control circuitry to generate the first and second control pulses comprises circuitry to stagger the first and second control pulses in time such that the trailing edge of the first control pulse is substantially aligned with the leading edge of the second control pulse.

13. The integrated-circuit image sensor of claim 11 wherein the control circuitry comprises circuitry to generate a first compensation pulse on the second signal line staggered in time with respect to the first control pulse such that capacitive feedthrough to the shared floating diffusion node from a leading edge of the first control pulse is counteracted by capacitive feedthrough to the shared floating diffusion node from a trailing edge of the first compensation pulse.

14. The integrated-circuit image sensor of claim 13 wherein the control circuitry further comprises circuitry to generate one or more additional compensation pulses on one or more other signal lines, the one or more additional compensation pulses having respective trailing edges substantially aligned with the trailing edge of the first compensation pulse such that the one or more additional compensation pulses and the first compensation pulse act in combination to counteract capacitive feedthrough to the shared floating diffusion node from the leading edge of the first control pulse.

15. The integrated-circuit image sensor of claim 14 wherein each of the one or more additional compensation pulses and the first compensation pulse are generated with an amplitude less than an amplitude of the first control pulse.

16. The integrated-circuit image sensor of claim 14 wherein the one or more additional compensation pulses and the first compensation pulse constitute a total of N compensation pulses and each have a nominal amplitude of A divided by N, where A is a nominal amplitude of the first control pulse and N is an integer greater than one.

17. The integrated-circuit image sensor of claim 14 wherein the one or more other signal lines comprise control signal lines connected to one or more other pixels, respectively, within the pixel array.

18. The integrated-circuit image sensor of claim 17 wherein the control circuitry further comprises circuitry to assert a third control pulse on one of the one or more other signal lines to enable photocharge accumulated within a photosensitive element of the respective pixel connected to the one of the one or more other signal lines to be transferred to the shared floating diffusion node.

19. The integrated-circuit image sensor of claim 13 wherein an amplitude of the first compensation pulse is lower than an amplitude of the second control pulse and insufficient to enable photocharge transfer from the photosensitive element of the second pixel to the shared floating diffusion node.

20. The integrated-circuit image sensor of claim 13 wherein the control circuitry further comprises circuitry to generate a second compensation pulse on the first signal line staggered in time with respect to the second control pulse such that capacitive feedthrough to the shared floating diffusion node from a trailing edge of the second control pulse is counteracted by capacitive feedthrough to the shared floating diffusion node from a leading edge of the second compensation pulse.

21. An integrated-circuit image sensor comprising:
a pixel array including first and second pixels coupled to first and second signal lines, respectively, the first and second pixels having respective photosensitive elements and a shared floating diffusion node; and
means for generating first and second control pulses on the first and second signal lines, respectively, to enable photocharge accumulated within the photosensitive elements of the first and second pixels to be transferred to, and combined within, the shared floating diffusion node, the first control pulse being time-staggered relative to the second control pulse such that capacitive feedthrough to the shared floating diffusion node from a trailing edge of the first control pulse is counteracted by capacitive feedthrough to the shared floating diffusion node from a leading edge of the second control pulse.

\* \* \* \* \*